United States Patent [19]

Focke

[11] 4,296,590
[45] Oct. 27, 1981

[54] METHOD AND APPARATUS FOR CONVEYING SIX-PACK CONTAINERS TO CARTON BLANK

[75] Inventor: Heinz Focke, Verden, Fed. Rep. of Germany

[73] Assignee: Focke & Co., Bremen, Fed. Rep. of Germany

[21] Appl. No.: 207,040

[22] Filed: Nov. 14, 1980

Related U.S. Application Data

[63] Continuation of Ser. No. 955,827, Oct. 30, 1978, abandoned.

[30] Foreign Application Priority Data

Nov. 11, 1977 [DE] Fed. Rep. of Germany ....... 2750533

[51] Int. Cl.$^3$ .............................................. B65B 35/30
[52] U.S. Cl. ...................................... 53/531; 53/209; 198/420; 198/425
[58] Field of Search ............... 198/425, 487, 491, 492, 198/461, 420, 577, 740; 53/48, 147, 153, 443, 448, 531, 543, 209

[56] References Cited

U.S. PATENT DOCUMENTS

| 1,961,661 | 6/1934 | Fuller | 198/740 |
| 3,333,676 | 8/1967 | Sherman | 198/425 |
| 3,368,660 | 2/1968 | Standley | 198/425 |
| 3,572,495 | 3/1971 | Luginbuhl | 198/740 |
| 3,747,739 | 7/1973 | Fuchs et al. | 198/425 |
| 3,823,813 | 7/1974 | Holt | 198/425 |
| 3,826,348 | 7/1974 | Preisig et al. | 198/425 |
| 4,073,375 | 2/1978 | Hart et al. | 198/577 |

FOREIGN PATENT DOCUMENTS

| 2145339 | 3/1973 | Fed. Rep. of Germany | 198/425 |
| 2259769 | 8/1975 | France | 198/425 |

Primary Examiner—Joseph E. Valenza
Attorney, Agent, or Firm—Sughrue, Mion, Zinn, Macpeak and Seas

[57] ABSTRACT

Two parallel lines 13, 14 of six-packs 10 are continuously delivered to a stop device 38 and starting conveyor 19 disposed above a stationary platform 24 by a belt conveyor 15. The stop device and starting conveyor carry downwardly depending pins 39, 40; 22, 23 that are synchronously driven both transverse to and in the transport direction. These pins separate the six-packs into groups 18 of two and accelerate them to an intermediate conveyor 20 running at the same speed and comprising endless chains 30 mounting transverse bars 29 that pass through opening slots 26, 28 at the beginning and end of the conveyor 20 and engage the six-pack groups at their rear ends. The groups converge along the conveyor 20, at the end of which they are engaged by an end conveyor 21 in the form of a slide member 31 coupled to a pantograph linkage and driven by a chain drive 33. The slide member has front and rear arms 41, 32 that engage the converged six-pack groups 18 and accelerate them onto a partially folded carton blank 11, where they are halted in a properly registered position by a yieldable end stop member 36. The loaded blank is then removed transverse to the feed direction for further wrapping, and a fresh blank is fed into the loading station. The spaced separation of the groups and their accelerated movement by the end conveyor allows time for the removal and replacement of the carton blanks, and the return of the slide member to engage a fresh group of six-packs.

16 Claims, 7 Drawing Figures

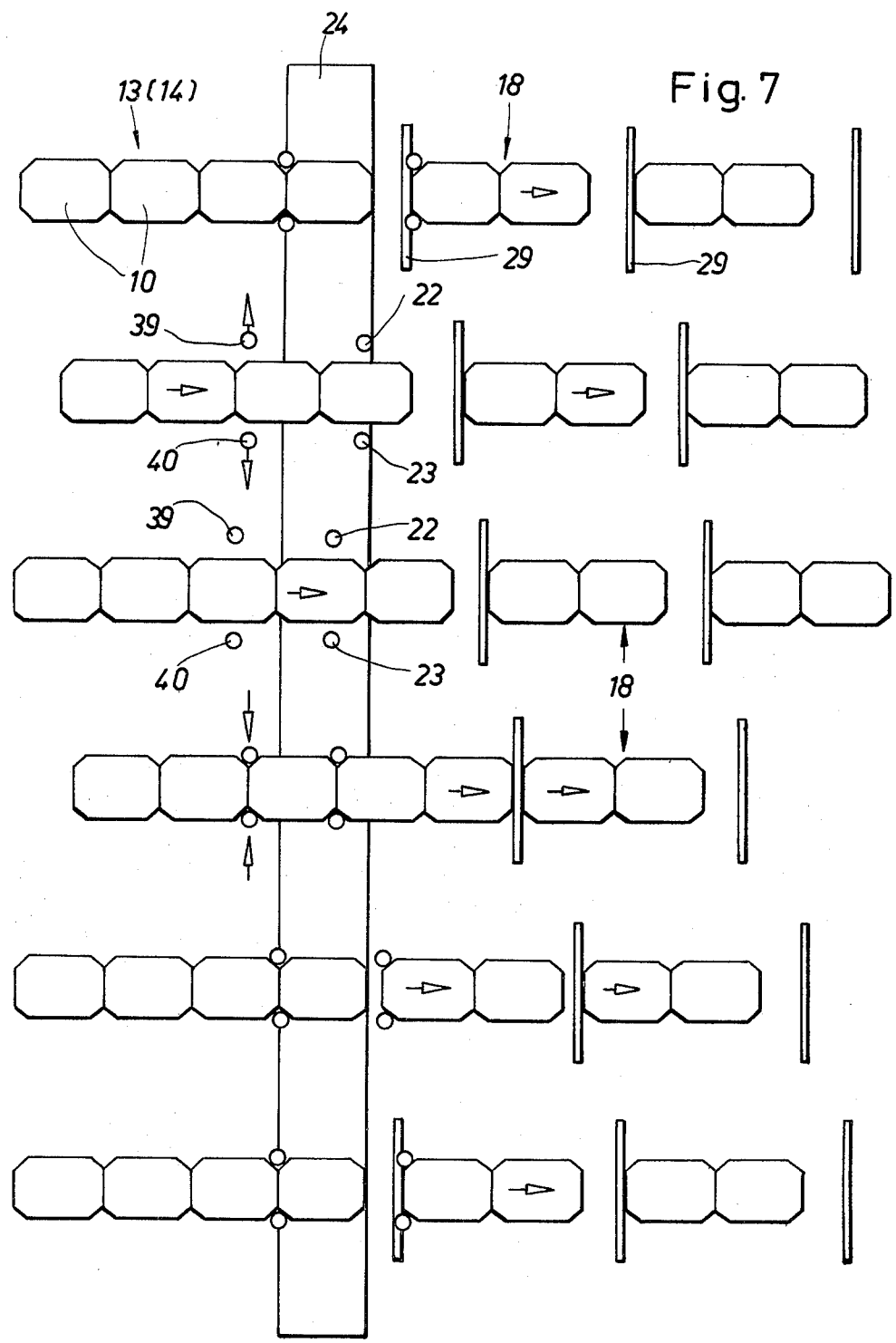

METHOD AND APPARATUS FOR CONVEYING SIX-PACK CONTAINERS TO CARTON BLANK

This is a continuation of application Ser. No. 955,827, filed Oct. 30, 1978, now abandoned.

BACKGROUND OF THE INVENTION

This invention relates to a method and apparatus for feeding groups of objects, particularly bottle or can six-packs to a carton blank.

The invention concerns the production or filling of cartons and tray packages with bottles, cans, etc. In so doing an endless line of objects coming from a filling machine forms groups for each carton. These groups and then fed to and into partially folded carton blanks. The remaining folding and sealing of the carton then takes place. Instead of individual groups of objects a plurality of preformed small packages, for example so-called six packs, can also be fed to a common carton.

A problem with this type of packaging concerns achieving high performance while maintaining a gentle handling of the objects to be packaged. A high cycle rate of the machine requires at least periodic correspondingly high transport speeds of the objects. On the other hand, at the moment of introduction into the carton or container, the objects must be slowed to a stop.

SUMMARY OF THE INVENTION

The basic purpose of the invention is to provide a method and apparatus by means of which a careful handling of the objects is assured together with high performance and correspondingly high periodic transport speeds of the objects.

To achieve this objective, the method according to the invention is characterized in that the objects are accelerated in stages until their reception by the container or the like. The objects, for example coming from a filling machine, are transported at a certain speed by a preliminary conveyor. The next step is to form individual groups of objects from the endless lines. Beginning at a starting speed of zero, the objects are accelerated in two stages up to a relatively high final speed until they are delivered to the container, whereat they are slowed to a stop. The delivery speed of the objects attained before their arrival at the carton blank allows sufficient time to ensure that the group is properly placed and aligned in the container or on the blank.

The apparatus according to the invention is characterized in that the objects are accelerated in stages by at least two successive transport conveyors until they are received by the carton blank. Accordingly, a first starting conveyor serves simultaneously to separate groups of the objects from the delivery lines. During the separation of the groups the delivery lines are momentarily stopped.

The end conveyor for the final acceleration and delivery of the objects to the carton blank is formed as a slide which is moved back and forth in a controlled path of movement. The slide is equipped with front and possibly side holders such as a hood which partially surrounds the objects from above. In this manner it is assured that individual objects of the group do not change their relative position or tip over during the acceleration of the objects and their abrupt slowing to a stop.

BRIEF DESCRIPTION OF THE DRAWINGS

In the drawings:

FIG. 7 is a schematic plan view showing the different phases of the packaging process in the area near the formation of groups.

DETAILED DESCRIPTION OF THE PREFERRED EMBODIMENT

Figure 1:
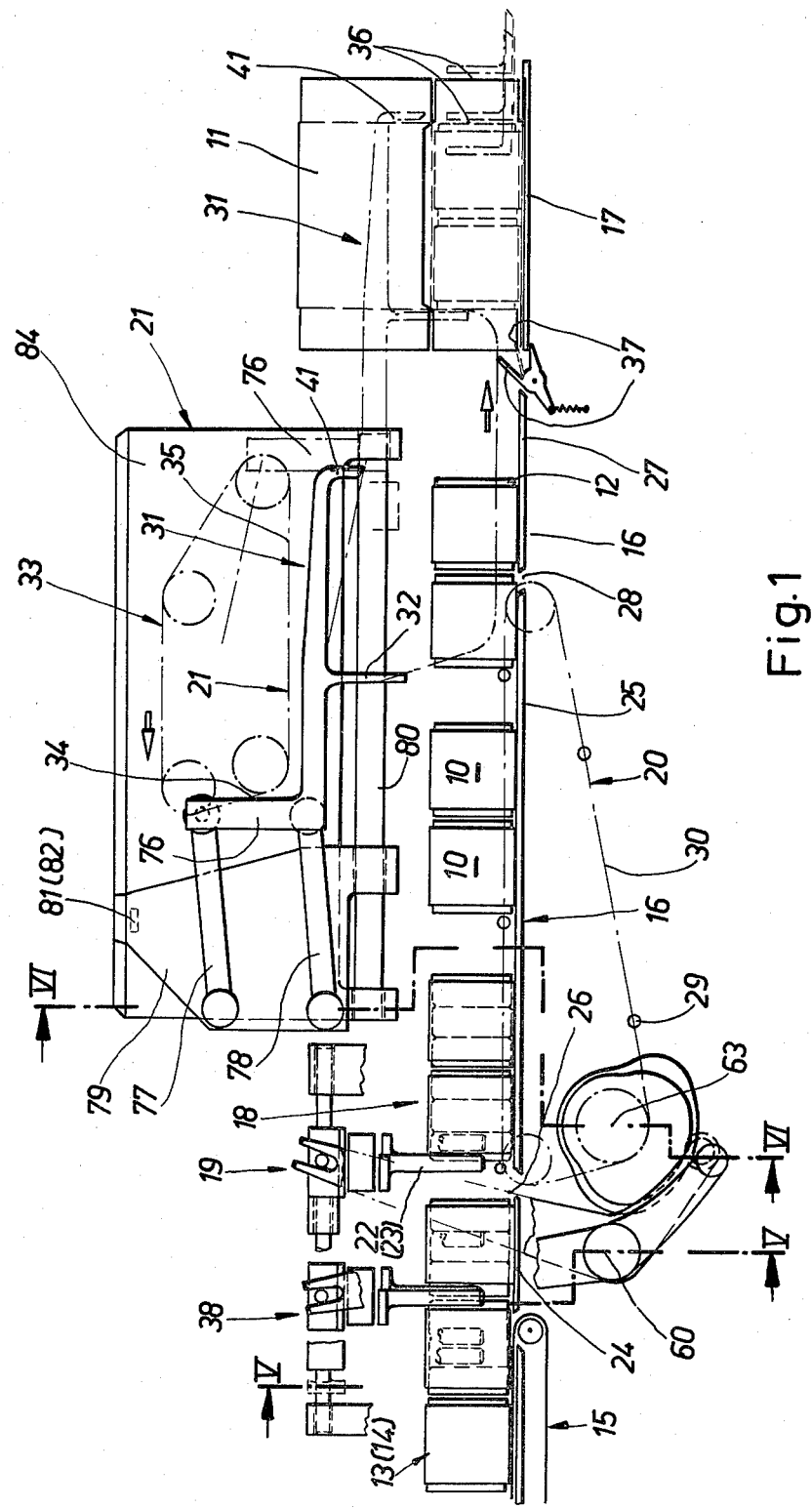
FIG. 1 is a simplified side view of a device for packaging multipacks in a carton.
Figure 2:
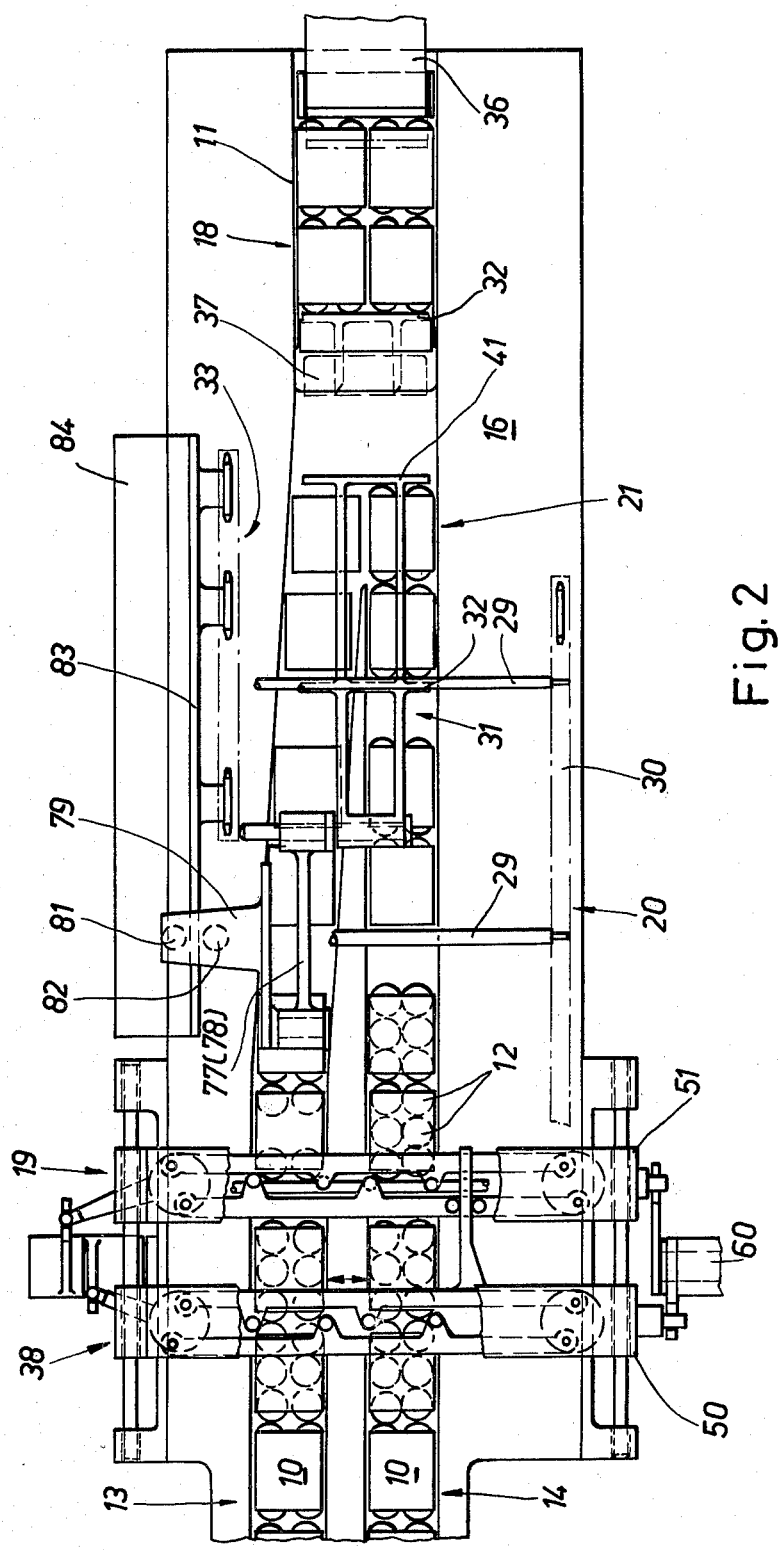
FIG. 2 is a plan view of the device according to FIG. 1.
Figure 3:
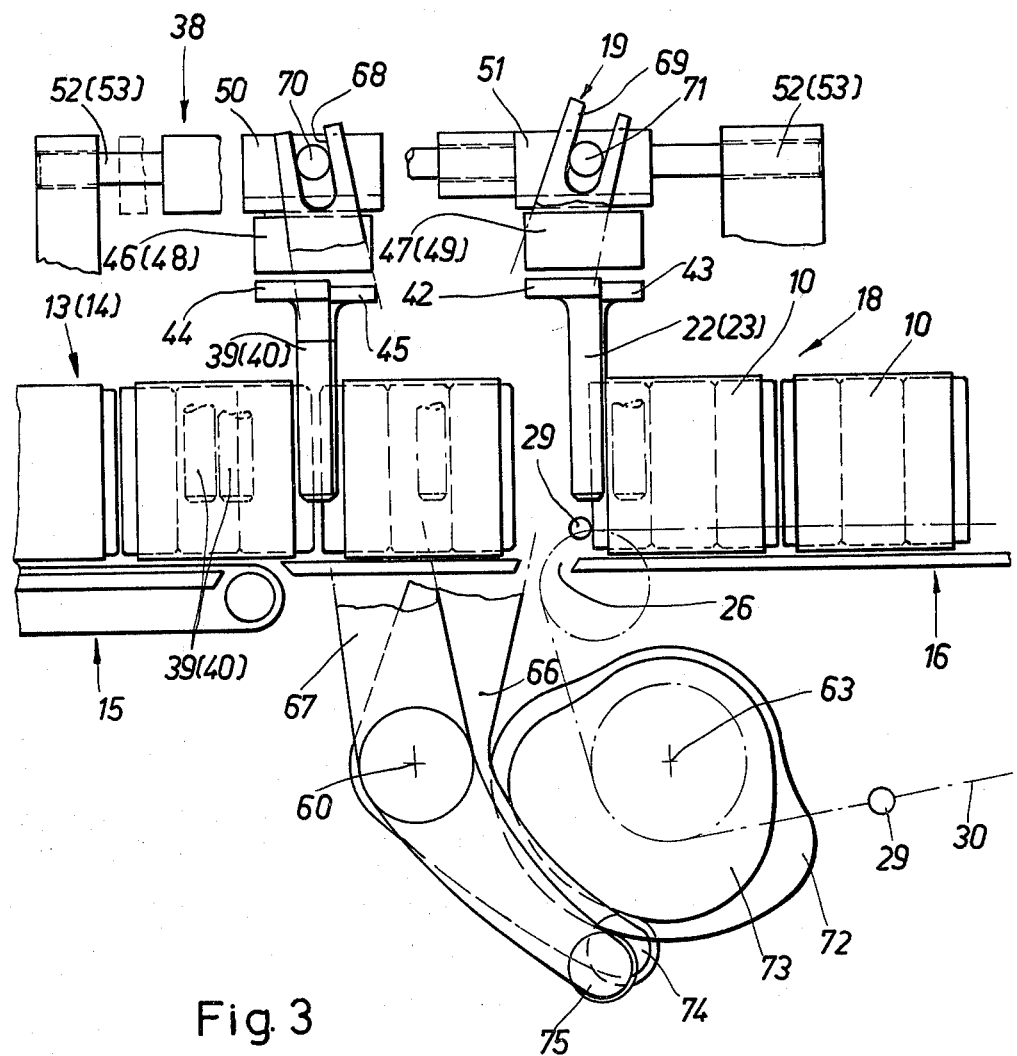
FIG. 3 is an enlarged side view of the device according to FIGS. 1 and 2 in the area near the formation of groups.
Figure 4:
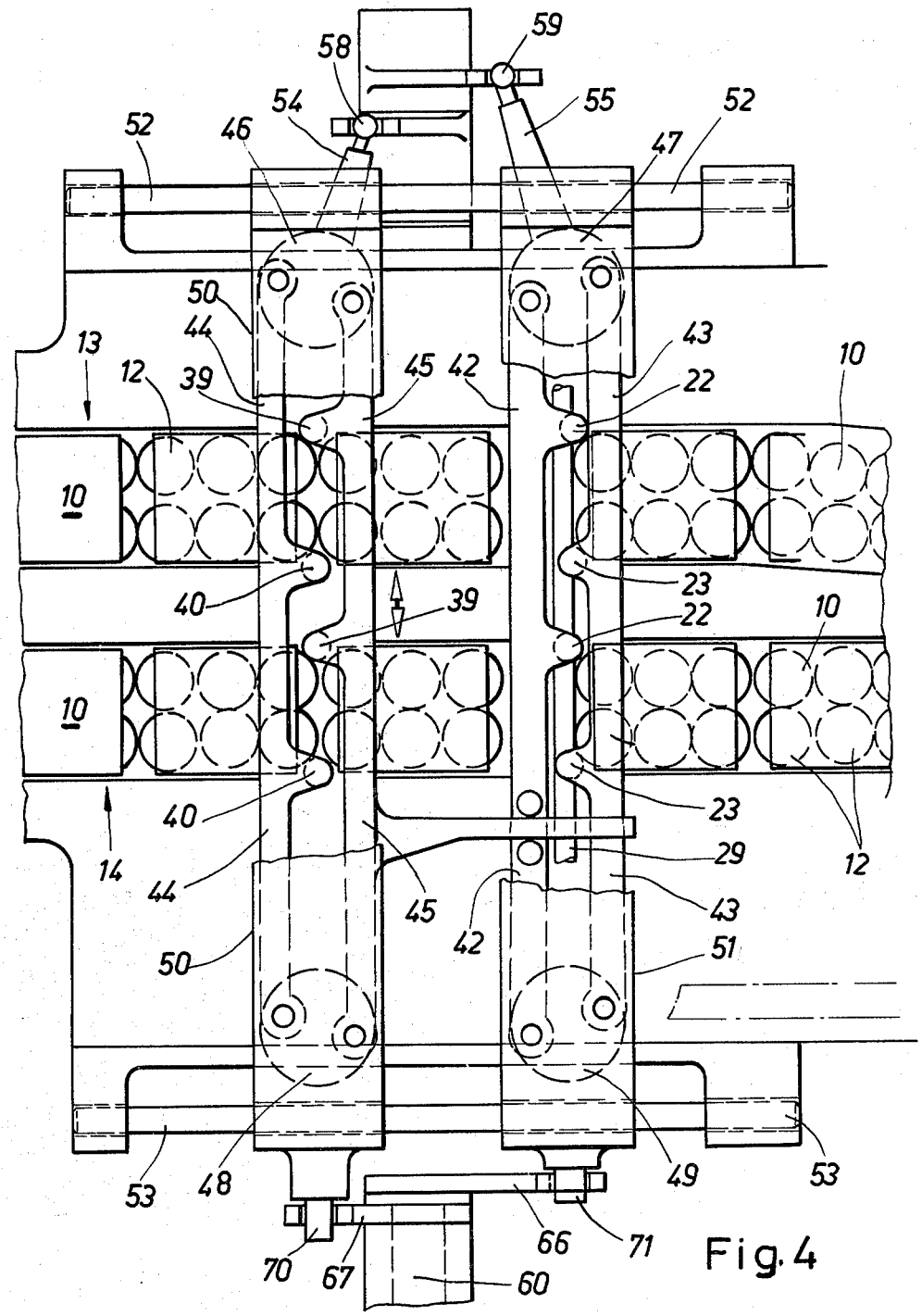
FIG. 4 is a plan view of FIG. 3.
Figure 5:
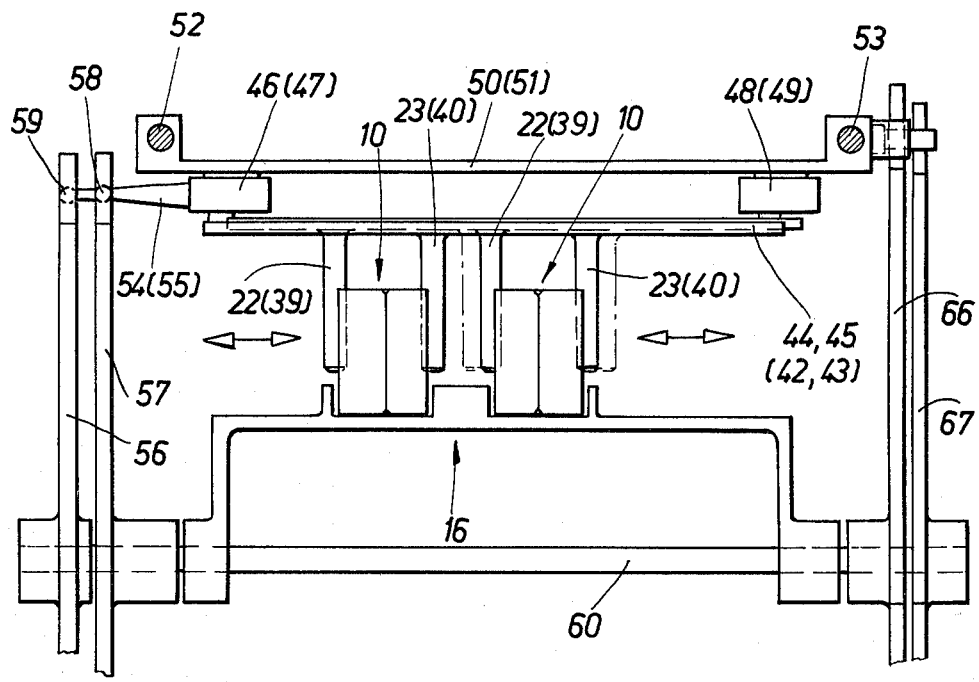
FIG. 5 is an enlarged cross-section of the device according to FIGS. 1 and 2 taken on the line V—V in FIG. 1.
Figure 6:
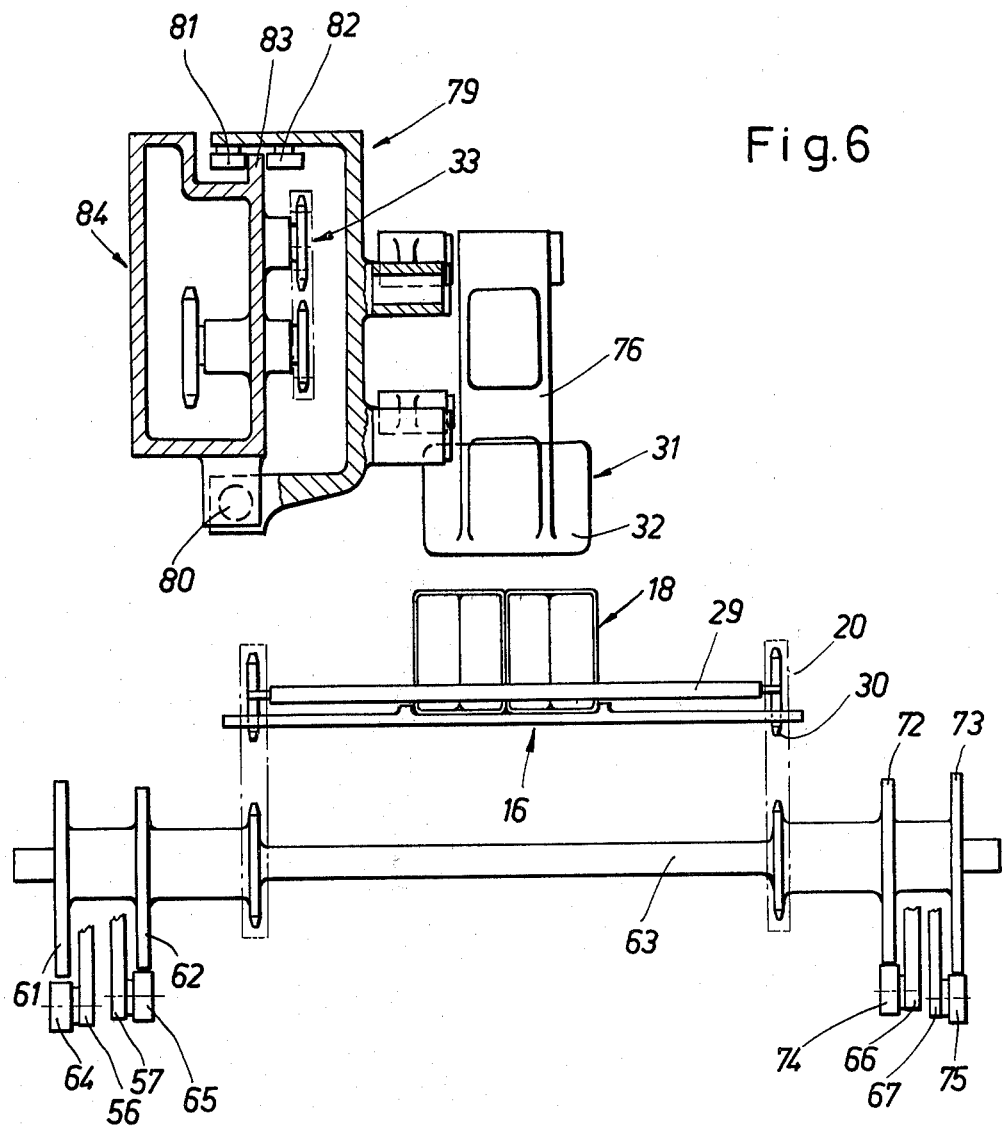
FIG. 6 is an enlarged cross-section taken on line VI—VI in FIG. 1.

In the present embodiment four six-packs are transported as objects 10 to a common carton 11 and packed therein. The packs each consist of six cans 12.

The objects 10 are transported in close succession in two endless lines 13 and 14 on a preliminary belt conveyor 15. Two objects 10 are then separated from each of the lines 13, 14, brought together, and delivered to a carton 11. The carton lies partially folded in the packaging path 16 of the objects 10. The four objects are placed on a floor wall 17 of the blank for the carton 11, which lies in the packaging path. The further folding and completion of the carton thereafter takes place in a suitable manner.

The objects 10, after separation from the lines 13, 14, are seized as a group 18 and accelerated in stages until their placement on the blank of the carton 11. This transport of the groups 18 first takes place on a starting conveyor 19, which also separates the groups 18 from the lines 13 and 14. Adjacent thereto is an intermediate conveyor 20 which has no velocity increase, followed by an end conveyor 21 having a higher speed than the intermediate conveyor 20 or the starting conveyor 19. This end conveyor places the objects 10 on the blank of the carton 11.

The starting conveyor 19 consists of a group of carrier pins 22 and 23, which enter into the sides of the line 13, 14 in the area between groups 18 and then basically grasp the groups on their rear sides. The carrier pins 22, 23 are moved by a drive mechanism both in the direction of delivery and transverse to it.

The packaging path 16 is divided into several sections. A platform 24 is arranged adjacent the preliminary conveyor 15, and receives the respective groups 18. Between the platform 24 and a path section 25 associated with the following intermediate conveyor 20, there is an opening 26. A further path section 27 follows the path section 25, again with an opening 28, and is associated with the end conveyor 21.

The intermediate conveyor 20 is formed as a bar conveyor having cross bars 29 between endless chain links 30. The bars 29 pass through the openings 26, 28 at the beginning and end of the path section 25. A group 18 transported by the starting conveyor 19 is grasped on the rear side by a bar 29 and transported to the end conveyor 21.

The end conveyor 21 is formed as a slide 31 which basically performs a back and forth movement and grasps the group 18 on the rear side by means of a carrier arm 32. The slide 31 is lowered onto the group 18 along a path of movement determined by a chain drive 33 for the slide 31. A rear, downwardly directed portion 34 of the chain drive 33 causes the slide 31 to approach the group 18 from the rear at a correspondingly higher speed. As soon as the group is grasped, an increase in advancement speed occurs due to the slide 31 being diverted out of its downward direction and into a horizontal motion, which is determined by a lower portion 35. At the end of this movement in the direction of transport the slide 31 is lifted from the group 18 by a corresponding diversion of the chain drive 33. When the slide 31 with the group 18 has reached the end position, a gradual slowing of the movement takes place due to the diversion of the chain drive 33 and the upwardly diverted motion of the slide 31 caused thereby.

To assure that there is no undesired relative shifting of the objects 10 in the group 18 during the transport of the group 18 by the slide 31 at relatively high speed, the slide 31 is formed as a hood which surrounds the top of the group 18. On the front side, as seen from the direction of transport, a support 41 is provided as part of the slide 31. The group 18 is accordingly fixed between the carrier arm 32 and the support 41 during transport.

The exact end position of the group 18 on the blank of the carton 11 is determined by an end stop 36. This end stop 36 can be moved in the direction of transport and is controlled in such a manner that it runs toward the transported group 18 and then travels back into the end position (center position in FIG. 1) with the group 18. In this manner a hard, shock-like striking of the group 18 against the end stop 36 is avoided. The end stop 36 can be retracted even further for the cross transport of the group 18 with the carton 11.

The objects 10 in the present case are pushed onto the floor wall 17 of a blank. To prevent the pushing motion from changing the position of the blank, a pivotable approach ramp 37 is provided in the packaging path 16, which ramp is tipped by the transported group 18 until it reaches an angled contract on the outer edge of the blank. At the completion of the pushing movement the approach ramp 37 is pivoted back to its original position by a helical spring. In this position the blank of the carton 11, which is provided with overlapping side flaps, can be transported away with the group 18 across the packaging path 16.

The starting conveyor 19 is provided with a stopping device 38 for the lines 13, 14. The stopping device 38 and the starting conveyor 19 are constructed in a similar manner and their movements are synchronized.

Like the starting conveyor 19, the stopping device 38 is provided with two groups of stop pins 39 and 40. The carrier pins 22 and 23 of the starting conveyor 19 and the stop pins 39, 40 of the stopping device 38 are always moved together and in correspondingly same directions across the direction of transport of the objects 10. The movement in the direction of transport is such that when the lines 13, 14 are stopped by the pins 39 and 40, the carrier pins 22, 23 perform a relative movement in the direction of transport whereby two six-packs on each line are accelerated to the speed of the intermediate conveyor 20. To stop the lines 13, 14 and accelerate the objects 10, the pins 22, 23, 39, 40 enter the sides of the lines in the area of "notches" or recesses which are formed by the round shape of the cans, bottles or the like.

The coordinated movement of the carrier and stop pins may be best seen in FIG. 7, where the sequence proceeds from the top to the bottom. As described above the lines 13, 14 are stopped by the pins 39, 40 which grasp the outer edge region of the cams 12. A halted six-pack thus finds itself with no drive on the platform 24. In front of it in the direction of transport are two six-pack objects 10 which are grasped by the carrier pins 22, 23 and transported with acceleration to the continuously running intermediate conveyor 20.

The carrier and stop pins are then simultaneously moved apart from each other and thereby out of engagement with the objects 10. While it is true that both the separated groups 18 and the lines 13, 14 are further transported by the intermediate conveyor 20 and the preliminary conveyor 15, respectively, the movement of the drawn apart pins is away from each other until a position is reached as shown in the third illustration of FIG. 7. The distance of the carrier pins 22, 23 from the stop pins 39, 40 corresponds basically to the length dimension of a partial group or object 10. The carrier and stop pins then run for a short distance with the objects 10, entering thereby into the lines 13, 14 by suitable movement across the direction of transport, which lines were previously transported until reaching contact with the intermediate conveyor 20 or a bar 29 thereof. In this engaged position both groups of pins move together with the objects 10 until the "neutral" object 10 stands on the platform 24 between the carrier pins 22, 23 on one side and the stop pins 39, 40 on the other side. The stop pins are then halted, while the carrier pins accelerate the objects 10 lying in front of them in the direction of transport up to the speed of the intermediate conveyor. Thus, the original position shown at the top of FIG. 7 is regained. The speed of the preliminary conveyor 15 is greater than the speed of the intermediate conveyor 20, so that the lines 13, 14 catch up to the intermediate conveyor 20 after the disengagement of the pins.

To carry out these movements the carrier pins and stop pins are each arranged in pairs on cross beams 42, 43 or 44, 45, respectively, above the lines 13, 14. The movements of the pins across the direction of transport of the objects 10 is effected by corresponding cross movements of the beams 42-45. These beams are pivotally mounted at both ends on or next to rotating elements 46, 47 and 48, 49. The rotating elements in turn are rotatably mounted on or next to the underside of a cross support 50 or 51. The cross supports are in turn mounted at their ends to stationary slide rods 52, 53 at both sides of the packaging path 16. The cross supports 50, 51 can be moved back and forth in the longitudinal direction of and on these slide rods 52, 53.

The drive of the cross beams 42-45 and thus the cross movement of the carrier and stop pins is implemented by the rotational movement of the respective rotational elements 46 and 47. These elements are connected with drive levers 56, 57 by drive arms 54, 55, the drive levers being driven in a pivoting sense to transfer corresponding pivoting motions to the drive arms 54, 55. These pivoting motions, in turn, cause rotations of the elements 46, 47 over an angular range, which results in opposite movements of the cross beams 42-45 because they are mounted with their ends on opposite sides of the rotational center points of the elements 46, 47, 48, 49. The drive arms 54, 55 are rigidly connected with the rotational elements and connected with the drive levers 56, 57 by ball joints 58, 59, so that the various complex movements can be properly transferred.

The drive levers 56 and 57 are located on a common, main cross axle 60, and are driven by rotating cam discs 61 and 62 mounted on a main shaft 63. The levers 56 and 57, which extend beyond the axle 60, end in follower rolls 64, 65 which engage the circumferences of the cam discs 61, 62.

The movement of the carrier pins 22, 23 and stop pins 39, 40 in the direction of transport is carried out in a similar manner. On the side of the packaging path 16 opposite the drive levers 56 and 57, pivot arms 66 and 67 are also pivotally mounted on the main axle 60. The free ends of these pivot arms 66, 67 are drivingly connected with respective cross supports 50, 51. The free or upper ends of the pivot arms are formed in the shape of forks for this purpose, and a pin 70 or 71 on the cross support 50 or 51 enters an open slit 68 or 69. The drive of the pivot arms 66, 67 is produced in the same manner as with the drive levers 56, 57, namely by means of cam discs 72 and 73 on the main shaft 63. The pivot arms 66, 67 engage the cam discs through follower rolls 74, 75.

The main shaft 63 is also the drive shaft of the intermediate conveyor 20.

For the complex movements of the slide 31, it is connected with the chain drive 33 by means of a pantograph guide. The slide thus has an angled, upwardly directed shank 76, to which two parallelogram guides 77 and 78 are pivotally connected. The other ends of these parallelogram guides 77, 78 are also pivotally connected to a guide slide 79. The end of the shank 76 in the area of the mounting for the upper parallelogram guide 77, is rigidly connected with the chain drive 33 to provide the necessary drive coupling.

The guide slide 79 is slidably mounted on a stationary support rod 80. On the opposite, upper side additional support is provided by two supporting rolls 81 and 82 which run at both sides of a guide edge 83 of a stationary housing 84. The slide 31 thus performs a basically parallel movement by means of this drive, whose path is the same as that of the chain drive 33.

The housing 84 includes the drive (not shown) for the chain drive 33. The sprocket wheels for the latter are mounted on the outside of the housing 84.

What is claimed is:

1. An apparatus for forming and conveying packs of articles, particularly bottles and cans, to a packing container, comprising:
(a) a feed conveyor (15) for continuously supplying article packs (10) to an input end of a transport path of the apparatus in two distinct lines (13,14),
(b) means including a stopping device (38) and a beginning conveyor (19) disposed in the transport path following the feed conveyor for receiving the article packs, separating them into plural pack groups (18), and delivering the groups to an input end of an intermediate conveyor (20) disposed in the transport path following said means, said beginning conveyor (19) accelerating the groups (18) to the speed of said intermediate conveyor (20),
(c) an end conveyor (21) disposed in the transport path following the intermediate conveyor for receiving the pack groups therefrom and transporting them to a final stop position at a packing station, said end conveyor comprising:
(1) a movable slide member (31) disposed above the transport path,
(2) means for lowering the slide member,
(3) a pusher plate (32) depending downwardly from the slide member for engaging the rear ends of pack groups upon the lowering of the slide member,
(4) a counterstop (41) spaced from the pusher plate and depending downwardly from the slide member for engaging the front ends of pack groups,
(5) means for driving the slide member at a higher horizontal conveying speed than the intermediate conveyor to thereby accelerate pack groups engaged by the slide member away from those behind to provide sufficient handling time at the stop position before the next pack groups arrive, and
(d) a yieldable end stop (36) for determining the stopping position of the pack groups, said end stop being operable to move toward the approaching groups and then be driven back with the groups to said stopping position.

2. An apparatus according to claim 1, wherein the intermediate conveyor comprises a plurality of push rods (29) arranged transversely between parallel endless chains (30), and the end conveyor is disposed above the intermediate conveyor such that the slide member can be lowered into an end area of the intermediate conveyor to engage pack groups thereon.

3. An apparatus according to claim 2, wherein the pack groups are conveyed to and placed on a floor wall (17) of a prefolded carton blank (11) by the end conveyor at the final stop position.

4. An apparatus according to claim 1, wherein the beginning, intermediate and end conveyors enter the transport path of the article packs from the sides, bottoms, and tops of the article packs, respectively.

5. An apparatus according to claim 4, wherein the beginning conveyor comprises a plurality of individual, downwardly depending carrier pins (22, 23) which enter the supply lines from the sides, between two successive article packs.

6. An apparatus according to claim 5, wherein two carrier pins are associated with each supply line and enter simultaneously from the sides to engage and accelerate a pack group.

7. An apparatus according to claim 6, wherein the feed conveyor is driven at a higher speed than the intermediate conveyor and comprises a continuously running conveyor belt.

8. An apparatus according to claim 5, wherein a stopping device (38) having downwardly depending stop pins (39, 40) precedes the beginning conveyor, the stop pins (39, 40) being fed into the sides of the supply lines to momentarily stop them.

9. An apparatus according to claim 8, wherein the carrier pins and stop pins are synchronously driven both in a direction transverse to the supply lines and in the direction of transport.

10. An apparatus according to claim 9, wherein the carrier pins and stop pins are separated from each other by the length of one article pack when they enter the supply lines.

11. An apparatus according to claim 10, wherein a pack group is separated from its supply line in the area of a stationary platform (24) disposed in the transport path (16).

12. An apparatus according to claim 11, wherein the carrier pins and stop pins depend downwardly from two pairs of parallel cross beams (42, 43; 44, 45) driven in unison and arranged above and transverse to the transport path.

13. An apparatus according to claim 12, wherein the two cross beams of each pair are longitudinally movable relative to each other.

14. An apparatus according to claim 13, wherein the cross beams are movable in the transport direction as well as transverse thereto.

15. An apparatus according to claim 1, wherein the slide member is driven by an endless chain drive (33) having a rear run (34) downwardly inclined in the direction of transport.

16. An apparatus according to claim 15, wherein the slide member is guided to move in a trapezoidal path by a pantograph mechanism (77, 78).

* * * * *